(12) United States Patent
Gruet et al.

(10) Patent No.: US 7,162,246 B2
(45) Date of Patent: Jan. 9, 2007

(54) MOBILE TELECOMMUNICATIONS WITH MULTISECTOR ANTENNAS

(75) Inventors: Christophe Gruet, Montigny-le-Bretonneux (FR); Eric Georgeaux, Montigny-le-Bretonneux (FR)

(73) Assignee: Nortel Networks Limited, St. Laurent (CA)

( * ) Notice: Subject to any disclaimer, the term of this patent is extended or adjusted under 35 U.S.C. 154(b) by 175 days.

(21) Appl. No.: 10/860,684

(22) Filed: Jun. 3, 2004

(65) Prior Publication Data

US 2005/0020312 A1 Jan. 27, 2005

(30) Foreign Application Priority Data

Jun. 3, 2003 (FR) ................... 03 06678

(51) Int. Cl.
*H04Q 7/20* (2006.01)

(52) U.S. Cl. ............... 455/442; 455/432.1; 455/436; 455/443; 455/444; 455/450; 370/331; 370/332; 370/333; 370/334

(58) Field of Classification Search ............. 455/432.1, 455/436–444, 447–449, 450–452.2, 561–562.1, 455/101; 370/331–334; 342/373–374, 367, 342/464–465; 343/835
See application file for complete search history.

(56) References Cited

U.S. PATENT DOCUMENTS 5,861,844 A * 1/1999 Gilmore et al. ............. 342/374
6,161,024 A * 12/2000 Komara ..................... 455/562.1
6,167,036 A * 12/2000 Beven ........................ 370/331
6,366,790 B1 * 4/2002 Kim .......................... 455/562.1
6,415,149 B1 * 7/2002 Bevan et al. ............... 455/442
2002/0086675 A1   7/2002 Mansour
2003/0232621 A1 * 12/2003 Brooks ....................... 455/424

FOREIGN PATENT DOCUMENTS

| EP | 1 005 245 | 5/2000 |
|---|---|---|
| WO | WO 91/09505 | 6/1991 |
| WO | WO 98/53633 | 11/1998 |
| WO | WO 01/31941 | 5/2001 |
| WO | WO 01/65795 | 9/2001 |

* cited by examiner

Primary Examiner—Steve M. D'Agosta
(74) Attorney, Agent, or Firm—Trop, Pruner & Hu, PC

(57) ABSTRACT

In order to cover a mobile telecommunication zone, an access network node comprises a first multisector antenna to transmit and receive in several first main directions on one and the same first fixed frequency each covering a first sector having on either side of the first main direction, a common border with another first sector. A second multisector antenna situated at the same place as the first multisector antenna makes it possible to transmit and receive in several second main directions on a second fixed frequency each covering a second sector having on either side of the second main direction, a common border with another second sector, each second main direction being on the axis of a border between two first sectors. A hard handover from the first to the second frequency is triggered for a mobile which is approaching a border common to two first sectors.

5 Claims, 3 Drawing Sheets

MOBILE TELECOMMUNICATIONS WITH MULTISECTOR ANTENNAS

BACKGROUND OF THE INVENTION

The field of the invention is that of mobile telecommunications.

A mobile telecommunications operator generally divides a geographical expanse of coverage into zones, each of which he equips with a transmit/receive antenna controlled by an access network node.

When the antenna is multisector, the latter transmits and receives in several so-called main directions which each define an angular sector of coverage so that the union of all the sectors ensures the transmit and receive coverage of the zone equipped by the antenna.

In technologies using the multiplexing of a multitude of channels, other than that of frequency multiplexing, a single fixed frequency common to several antennas allows a mobile to travel from one zone to another without having to change frequency.

The UMTS technology according to which orthogonal spectrum spreading codes on the fixed frequency are allocated to each channel is for example known. To each zone there corresponds a base node, (node B) of the access network which then manages a cell in the case of a single-sector antenna or several cells in the case of a multisector antenna, each cell then corresponding to a sector of the zone. A radio network controller (RNC) supervises several base nodes. One distinguishes between the downlinks for the communication channels from the access network to the mobiles and the uplinks for the communication channels from the mobiles to the access network. On each downlink, a distinct scrambling code makes it possible to distinguish a cell, a distinct orthogonal variable spreading code (OVSF standing for orthogonal variable spreading factor) makes it possible to distinguish each service in a cell. On each uplink, a distinct scrambling code makes it possible to distinguish a mobile, a distinct OVSF code makes it possible to distinguish each service within a mobile. Different collections of codes are allocated to neighbouring cells so as to minimise the external interference between cells. For a given fixed frequency, the quantity of possible channels is limited by the number of codes available.

When a mobile exits one zone in order to enter another, the preservation of frequency permits a soft handover. When a mobile is in a soft handover state, it has available several distinctive codes of zones for listening to several base nodes, each base node having available at least one distinctive code of the mobile for listening to the mobile. By means of known techniques, the RNC then manages the downlinks to the mobile and the uplinks from the mobile in such a way as to ensure continuity of communication on handover from one zone to another.

With a multisector antenna, when a mobile exits a sector in order to enter another, the preservation of frequency permits a softer handover. When a mobile is in a softer handover state, it has available several distinctive codes of sectors for listening to the base node on the basis of several main directions of the antenna, the base node then listening to the mobile on the basis of these same main directions of the antenna. By means of known techniques, the base node then manages the downlinks to the mobile and the uplinks from the mobile in such a way as to ensure continuity of communication on handover from one sector to another.

A problem arises, however, when the mobile is moving within the vicinity of a border between sectors, possibly making return trips from one sector to another. There may then be an undue number of softer handovers which among other things have the drawback of greater consumption of radiating power induced by the transmission of the antenna along two main directions and possibly by a larger power called for from the mobile to compensate for the reception losses induced at the border by the angular distancing of the mobile from each of the main directions.

A problem also arises when the mobile is travelling both in the vicinity of a border between sectors and of a border between zones, on account of the competing of a soft handover and of a softer handover.

SUMMARY OF THE INVENTION

A subject of the invention is an access network node for covering a mobile telecommunication zone, comprising a first multisector antenna arranged to transmit and receive in several first main directions on one and the same first fixed frequency usable to multiplex a first multitude of channels for communications with mobiles each situated in a first sector having on either side of one of the first main directions, a common border with another first sector.

The access network node comprises:
  a second multisector antenna situated at the same place as the first multisector antenna and arranged to transmit and receive in several second main directions on one and the same second fixed frequency usable to multiplex a second multitude of channels for communications with mobiles each situated in a second sector having on either side of one of the second main directions, a common border with another second sector, each second main direction being on the axis of a border between two first sectors so that each border between two second sectors is on the axis of a first main direction;
  means arranged to trigger a hard handover from a channel of the first multitude to a channel of the second multitude for a mobile which is approaching a border common to two first sectors and to trigger a hard handover from a channel of the second multitude to a channel of the first multitude for a mobile which is approaching a border common to two second sectors.

The second fixed frequency procured by the second multisector antenna makes it possible to almost double the quantity of channels multiplexed on a single frequency, without increasing the interference between channels inside the zone, the two frequencies being different.

The arrangement of means for handing over from the first multitude to the second multitude of channels and of course vice versa from the second to the first multitude of channels makes it possible to place the mobile routinely on the frequency which offers the best reception conditions. This arrangement also makes it possible to reduce the rate of softer handovers between sectors on one and the same frequency.

A possible embodiment consists in arranging the means in such a way as to regularly measure the reception power on the frequency not used by a mobile by creating brief nulls in the signal transmitted by the mobile at the current frequency. A measurement signal is then caused to be transmitted to the mobile on the reserve frequency in the nulls. When the access network node detects a stronger reception power on the reserve frequency, this signifies that the mobile is a smaller angular distance from a main direction of the other antenna than from a main direction of the antenna using the current frequency. However, this type of embodiment requires the implementation of a compressed mode on either side of each null so as to avoid information losses on transmission. The compressed mode is all the more difficult to implement when the mobile is a large angular distance from the current main direction.

Preferably, the means are arranged to periodically evaluate the strongest reception powers given by two main directions of the first, respectively of the second antenna, and to detect that the mobile is approaching a border common to two first sectors, respectively to two second sectors, when the powers evaluated are substantially equal.

It is then unnecessary to measure the receive power on the reserve frequency since equality of power along two main directions implies that the receive power on the reserve frequency along a main direction colinear with the mid-axis of the two main directions is better.

Advantageously, the means are also arranged to trigger a soft handover from a channel of the first multitude, respectively of the second multitude, to a channel of a third multitude, respectively of a fourth multitude of channels multiplexed on the first fixed frequency on the basis of another first multisector antenna, respectively on the second fixed frequency on the basis of another second multisector antenna belonging to another similar network node for covering an adjoining zone when a mobile which is using a channel of the first multitude, respectively of the second multitude, is approaching the adjoining zone.

Thus, the soft handover from one zone to another zone is performed under the optimal conditions of reception, by in fact considering the sectors for which the mobile is a small angular distance from an antenna main direction.

Particularly, the multisector antennas are three-sector antennas.

Another subject of the invention is a method of mobile telecommunication in which a mobile uses an up channel to communicate with an access network node comprising two multisector antennas arranged to transmit and receive in several interleaved main directions, each antenna using a fixed frequency to multiplex a multitude of communication channels, the up channel being multiplexed on one of the fixed frequencies called the current frequency, the other frequency being called the reserve frequency.

The method comprises:
a measurement step in which the access network node periodically evaluates the receive power on the up channel at the current frequency;
a sector test step in which the access network node analyses whether it is possible to obtain better receive power on the reserve frequency than the receive power evaluated at the current frequency;
a hard handover step in which the access network node replaces the current frequency with the reserve frequency so as to multiplex at least the up channel when it is possible to obtain better receive power on the reserve frequency than the receive power evaluated at the current frequency.

The step of measurement on the up channel which belongs to a multitude of channels multiplexed on the current frequency makes it possible to access the radial and angular coordinates of the mobile in a sector. The receive power can be evaluated on the basis of that measured along a main direction or of receive powers measured along several main directions. The sector test step makes it possible to detect that one of the main directions for which the associated frequency offers the best reception conditions.

The hard handover step, such as it is performed, makes it possible to hand over from a sector in the vicinity of whose border the mobile is situated, to a sector in the vicinity of whose central axis the mobile is situated. The hard handover between sectors which overlap is consequently more efficient than a softer handover between sectors which touch.

In the sector test step, the access network node can analyse whether it is possible to obtain a better receive power on the reserve frequency than the receive power evaluated at the current frequency by instructing the mobile to transmit measurement signals using the reserve frequency for brief instants. A compression mode is then necessary to compress the information that ought to have been transmitted using the current frequency during each brief instant so as to send this compressed information using the current frequency outside of these brief instants. The compression mode may impair the information.

Preferably:
in the measurement step, the access network node periodically evaluates two main directions giving the greatest values of receive power on the up channel;
in the sector test step, the access network node compares the receive powers in the two main directions evaluated;
in the hard handover step, the access network node replaces the current frequency with the reserve frequency so as to multiplex at least the up channel if the receive powers are substantially equal.

This avoids the need to perform measurements on a different reserve frequency from the current frequency and consequently dispenses with the compressed mode for doing this.

Advantageously, the method of mobile telecommunication comprises:
a zone test step in which the access network node gauges the total receive power of the up channel;
a soft handover step in which the access network node triggers a soft handover to another access network node while preserving the current frequency if the total receive power is too weak.

From the sector test step, it follows that the zone test step is performed with the frequency which offers the best reception conditions. These best reception conditions favour soft handover between zones without having to change frequency.

DESCRIPTION OF PREFERRED EMBODIMENTS

Figure 1:
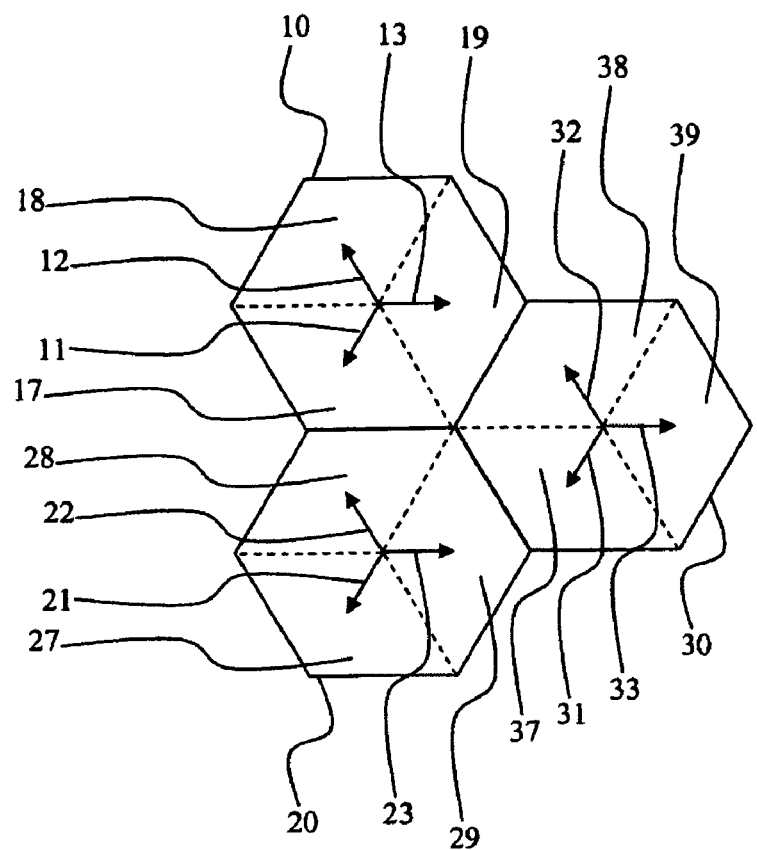
FIG. 1 shows zones with a three-sector antenna at the centre of each.

With reference to FIG. 1, the geographical coverage of a mobile telecommunication operator access network is divided into zones 10, 20, 30. Here only three zones are represented but it is understood that the number of zones is arbitrary and determined in such as way as to ensure the geographical coverage of the operator. The zones 10, 20, 30 are generally represented diagrammatically in hexagonal form which may in fact vary as a function of the typology of the terrain. Likewise the border between zones is in reality less marked than in the figure, the zones possibly overlapping so as to go progressively from one zone to another.

Disposed at the centre of each zone is a three-sector antenna arranged to transmit and receive on a fixed frequency $f_1$, in three main directions 11, 12, 13 in zone 10, respectively 21, 22, 23 in zone 20, respectively 31, 32, 33 in zone 30.

The three main directions of transmission reception of one and the same three-sector antenna make an angle of the order of 120° between themselves. For example in zone 10, the three-sector antenna gives for each main direction 11, 12, 13, a maximum of transmission and reception power which dwindles progressively for directions which deviate from the main direction. Thus, the transmission reception power encompasses a first sector 17 which is divided up on either side of the main direction 11, going from a maximum value in the main direction to a minimum value at the sector borders represented by the dashed lines which join the symmetric vertices of the zone 10 with respect to the main direction 11. Likewise, the transmission reception power encompasses a second sector 18, respectively a third sector 19 which is divided up on either side of the main direction 12, respectively of the main direction 13, going from a maximum value in the main direction to a minimum value at the sector borders represented by the dashed lines which join the symmetric vertices of the zone 10 with respect to the main direction 12, respectively to the main direction 13.

The above explanations in respect of zone 10 are readily carried over to zones 20 and 30.

In zone 20, the sector 27 exhibits a maximum transmission reception power along the main direction 21, the sector 28 exhibits a maximum transmission reception power along the main direction 22, the sector 29 exhibits a maximum transmission reception power along the main direction 23.

In zone 30, the sector 37 exhibits a maximum transmission reception power along the main direction 31, the sector 38 exhibits a maximum transmission reception power along the main direction 32, the sector 39 exhibits a maximum transmission reception power along the main direction 33.

All the three-sector antennas with main directions 11 to 13, 21 to 23, 31 to 32 have available one and the same fixed frequency f1 for multiplexing several communication channels. The multiplexing of the channels is therefore done by means other than frequency multiplexing. For example in a manner known in UMTS technology, a different spectrum spreading code is allocated to each communication channel, the spreading codes being mutually orthogonal.

A set of distinct spreading codes is allocated to each zone 10, 20, 30 so that the three-sector antennas do not interfere with one another.

When a communication mobile is for example in zone 10, the single frequency f1 allows it to communicate with an access network base node (node b in UMTS technology), using an up communication channel for transmission (or uplink) and a down communication channel (or downlink) for reception to which are allocated spreading codes which belong to the set of spreading codes which is allocated to zone 10. The mobile does not interfere with another mobile situated in zone 10 which uses the signal frequency f1 to communicate with the access network node since any other mobile uses another up communication channel for transmission and another down communication channel for reception to which are allocated other spreading codes which belong to the set of spreading codes which is allocated to zone 10.

When for example the mobile in communication exits zone 10 in order to enter for example zone 20, it hands over from up and down communication channels usable with the three-sector antenna, of zone 10 to up and down communication channels usable with the three-sector antenna of zone 20.

A soft handover corresponds to a replacing of the up and down communication channels usable with the three-sector antenna of zone 10 with up and down communication channels usable with the three-sector antenna of zone 20 with overlap period, that is to say during the overlap period the mobile continues to transmit and to receive on the channels usable by the antenna of zone 10 while it has begun to transmit and receive on the channels usable by the antenna of zone 20. So-called diversity signal processing techniques then allow continuous handover from the channels usable with the antenna of zone 10 to the channels usable with the antenna of zone 20.

The three-sector antenna of for example zone 10 preferably uses its main direction 11 to receive, respectively transmit on the up channels, respectively down channels of the communication mobiles situated in sector 17.

When a mobile in communication exits sector 17 in order to enter for example sector 18 while remaining in zone 10, it can preserve the same up and down communication channels usable with the three-sector antenna of zone 10. However, the three-sector antenna of zone 10 then preferably uses the main direction 12 when the mobile has arrived in sector 18.

A softer handover corresponds to a replacement of usage of the main direction in transmission reception of the three-direction antenna. The known techniques of diversity make it possible to preserve the use of the main direction 11 while superimposing thereon usage of the main direction 12 as long as the mobile is in the vicinity of the border which separates sectors 17 and 18 and then to dispense with the use of the main direction 11 when the mobile has receded from this border in sector 18.

The benefit of separating the channels by means other than multiplexing by allocating different frequencies, such as for example the multiplexing by orthogonal spectrum spreading codes of the UMTS system, resides in the possibility of enabling a communication mobile to move from one zone to another or from one sector to another without having to change frequency. The three-sector antennas transmitting and receiving continuously on the same frequency independently of the position of the mobiles, it then suffices at the very most to change spreading code.

Figure 2:
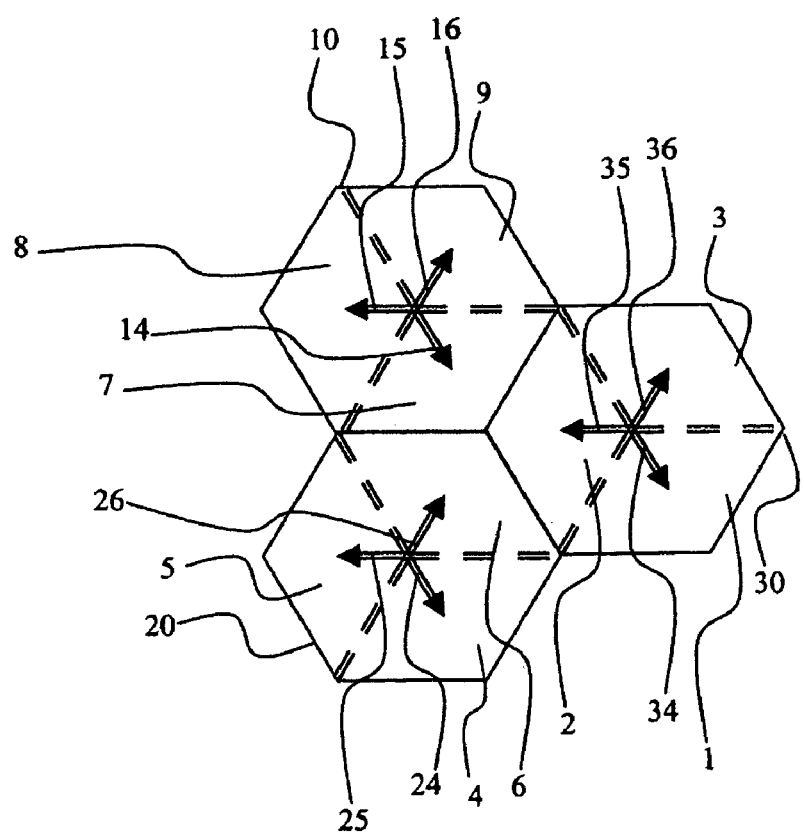
FIG. 2 again shows the zones of FIG. 1 with at the centre of each, another three-sector antenna with main directions pivoted by 30° with respect to those in FIG. 1.

With reference to FIG. 2, found therein are the same zones 10, 20, 30 as in FIG. 1. It is understood that FIG. 2 is overlaid on FIG. 1, the representation as two figures being adopted for the sake of clarity.

Disposed at the centre of each zone is a second three-sector antenna at the same place as the first three-sector antenna of FIG. 1. Each three-sector antenna represented in FIG. 2 is arranged to transmit and receive on a second fixed frequency f2, in three main directions 14, 15, 16 in zone 10, respectively 24, 25, 26 in zone 20, respectively 34, 35, 36 in zone 30.

The three main directions of transmission reception of one and the same three-sector antenna are those which define the borders between sectors represented in FIG. 1. For example in zone 10, the second three-sector antenna gives for each main direction 14, 15, 16, a maximum transmission and reception power which dwindles progressively for directions which deviate from the main direction. Thus, the transmission reception power encompasses a first sector 7 which is divided up on either, side of the main direction 14, going from a maximum value in the main direction to a minimum value at the sector borders represented by the double dashed lines which join the symmetric vertices of zone 10 with respect to the main direction 14. Likewise, the transmission reception power encompasses a second sector 8, respectively a third sector 9 which is divided up on either side of the main direction 15, respectively of the main direction 16, going from a maximum value in the main direction to a minimum value at the sector borders represented in by the double dashed lines which join the symmetric vertices in zone 10 with respect to the main direction 12, respectively to the main direction 13. The borders of the three sectors covered by the second three-sector antenna correspond to the main directions of the first three-sector antenna.

The above explanations in respect of zone 10 are readily carried over to zones 20 and 30.

In zone 20, the sector 4 exhibits a maximum transmission reception power along the main direction 24, the sector 5 exhibits a maximum transmission reception power along the main direction 25, the sector 6 exhibits a maximum transmission reception power along the main direction 26.

In zone 30, the sector 1 exhibits a maximum transmission reception power along the main direction 34, the sector 2 exhibits a maximum transmission reception power along the main direction 35, the sector 3 exhibits a maximum transmission reception power along the main direction 36.

All the three-sector antennas with main directions 14 to 16, 24 to 26, 34 to 36 have available one and the same fixed frequency f2 for multiplexing several communication channels. The multiplexing of the channels usable by the second three-sector antennas is therefore done here again by means other than frequency multiplexing. Returning to the example mentioned previously of UMTS technology, a different spectrum spreading code is allocated to each communication channel, the spreading codes being mutually orthogonal.

A set of distinct spreading codes is allocated to each zone 10, 20, 30 so that the second three-sector antennas do not interfere with one another. Neither do the second antennas interfere with the first antennas since their frequencies are fixed at different values.

The single fixed frequency f2 common to all the three-sector antennas represented in FIG. 2 makes it possible to implement soft handovers and softer handovers in a similar manner to the handovers described previously with reference to FIG. 1.

The first frequency f1 and the second frequency f2 make it possible to double the quantity of channels usable in each zone. Thus, certain mobiles situated for example in zone 10 use channels multiplexed by allocating different spreading codes on the same frequency f1 for reception and for transmission in at least one main direction 11, 12, 13 of the first three-sector antenna for zone 10. Other mobiles also situated in zone 10 use channels multiplexed by allocating different spreading codes on the same frequency f2 for reception and for transmission in at least one main direction 14, 15, 16 of the second three-sector antenna for zone 10.

The arrangement and the manner of operation of the access network node to which the antenna with main directions 11, 12, 13 and the antenna with main directions 14, 15, 16 belong are now described with reference to FIGS. 3 to 5.

Figure 3:
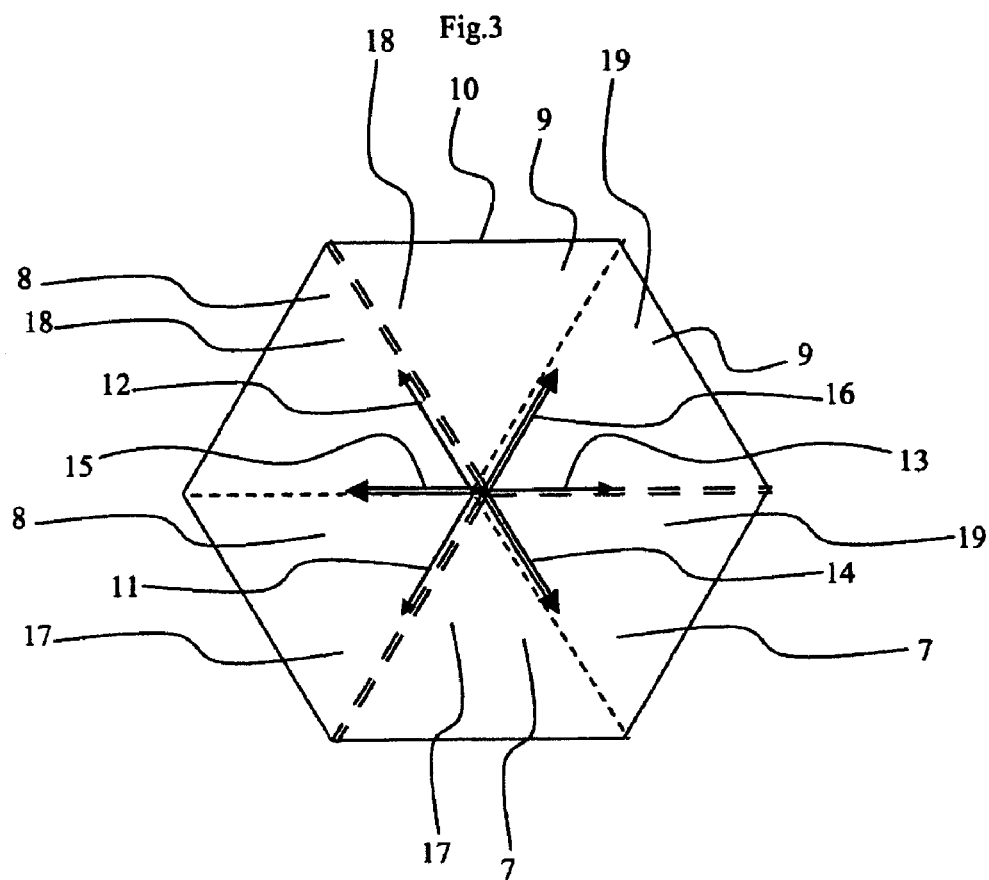
FIG. 3 shows a zone wherein are represented the two three-sector antennas.

FIG. 3 is a view of one of the zones, for example zone 10 obtained by superimposing views represented in FIGS. 1 and 2.

The main directions 11, 12, 13 of transmission and of reception of the first three-sector antenna are represented by a straightforward line. The main directions 14, 15, 16 of transmission and of reception of the second three-sector antenna are represented as a double line so as to better distinguish them in the figure. The borders between the sectors 17, 18 and 19 are represented by a straightforward dashed line. The borders between the sectors 7, 8 and 9 are represented by a double dashed line so as to better distinguish them in the figure. It is observed that sector 17 overlaps sector 7 on one side of the main direction 11 and overlaps sector 8 on the other side of the main direction 11. Likewise, sector 18, respectively 19, overlaps sector 8, respectively 9 on one side of the main direction 12, respectively 13 and overlaps sector 9, respectively 7 on the other side of the main direction 12, respectively 13.

Figure 4:
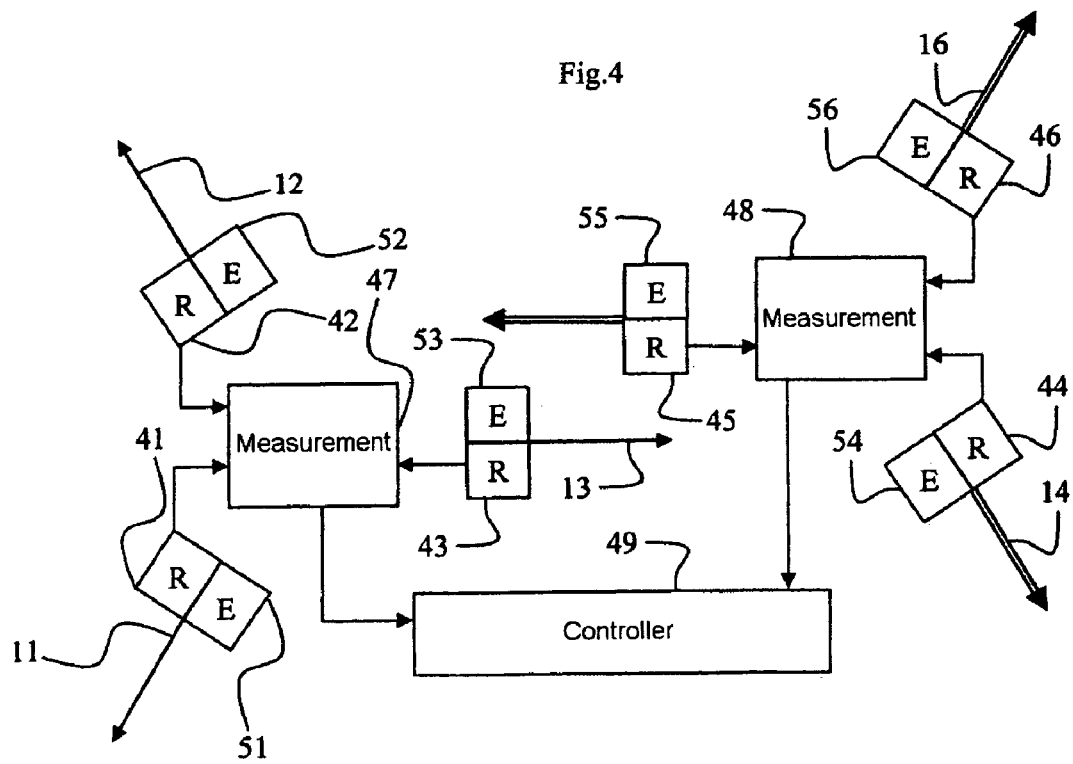
FIG. 4 is a partial diagram of an access network node in accordance with the invention.
Figure 5:
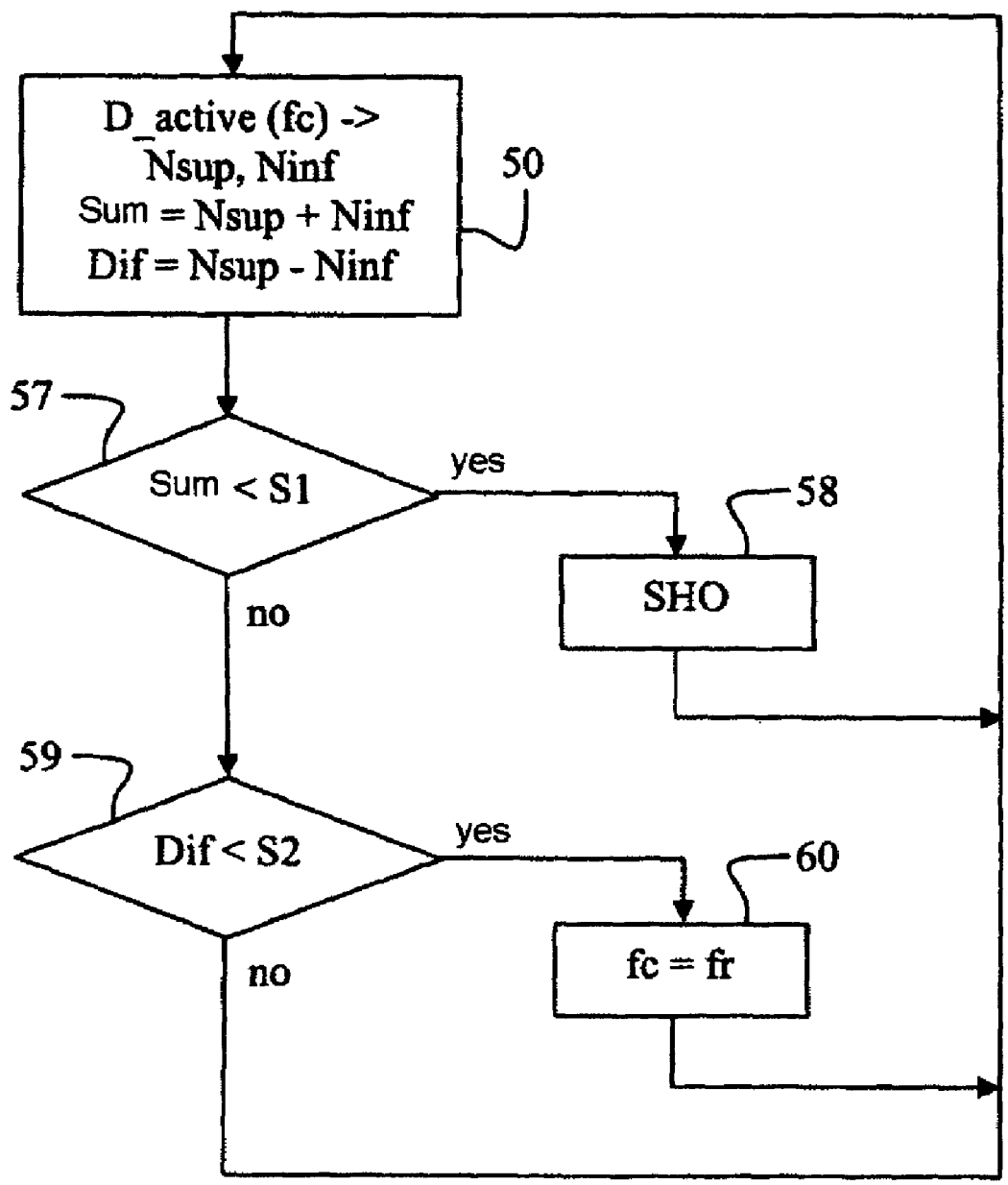
FIG. 5 shows method steps in accordance with the invention.

Represented in the partial diagram of FIG. 4 are access network node elements for implementing the invention in relation to the main directions 11, 12, 13, 14, 15, and 16. The customary elements for processing messages originating from and bound for the mobiles are not represented here.

In a conventional manner, the access network node comprises a receiver 41, 42, 43 as target for the up channels and transmitter 51, 52, 53 as source for the down channels which are multiplexed on the first fixed frequency f1 in the main direction 11, 12, 13. Likewise, the access network node comprises a receiver 44, 45, 46, as target for the up channels and a transmitter 54, 55, 56 as source for the down channels which are multiplexed on the second fixed frequency f2 in the main direction 14, 15, 16.

Measurement means 47 are arranged to continually measure the power of each up channel multiplexed on the frequency f1 such as it is received by that one of the receivers 41, 42, 43 which corresponds to the main direction of sector 17, 18, 19 wherein is found a mobile using the up channel and such as it is received by at least one other of the receivers 41, 42, 43 which corresponds to the main direction of a sector 17, 18, 19 closest to that wherein is found the mobile so as to be able to assess the radial distance of the mobile with respect to the antenna and the angular distance of the mobile with respect to the main direction.

Measurement means 48 are arranged to continually measure the power of each up channel multiplexed on the frequency f2 such as it is received by that one of the receivers 44, 45, 46 which corresponds to the main direction of sector 7, 8, 9 wherein is found a mobile using the up channel and such as it is received by at least one other of the receivers 44, 45, 46 which corresponds to the main direction of a sector 7, 8, 9 closest to that wherein is found the mobile so as to be able to assess the radial distance of the mobile with respect to the antenna and the angular distance of the mobile with respect to the main direction.

A controller 49 is arranged to receive from the measurement means 47 and 48, a reception level Nsup and a reception level Ninf of each active up channel. Each reception level Nsup, respectively Ninf, originating from the measurement means 47 corresponds to the greatest power, respectively to the immediately lower greatest power, of reception of an up channel for which the current frequency fc is the frequency f1. Each reception level Nsup, respectively Ninf, originating from the measurement means 48 corresponds to the greatest power, respectively immediately lower greatest power, of reception of an up channel for which the current frequency fc is the frequency f2.

The controller 49 is arranged to execute the method now described with reference to FIG. 5.

The controller 49 periodically executes a cycle of steps 50 and 57 to 60 for each active up channel.

In step 50, the controller 49 gathers two values of reception level Nsup and Ninf on the current frequency fc used by the active up channel. The level Nsup is in principle that of reception, given by the main direction in the sector wherein the mobile which is transmitting on the current channel is found. The level Ninf is the highest of the reception levels given by the main directions in the sectors neighbouring that wherein the mobile which is transmitting on the current channel is found.

For example, for a mobile transmitting on the frequency f1 in sector 17, the level Nsup is the reception level of the first three-sector antenna in the main direction 11, which level is known. theoretically to be a maximum when the mobile is in immediate proximity to the antenna, decreasing as the mobile recedes radially from the site of installation of the antenna or recedes angularly from the main direction 11. Theoretically is understood to mean that which results from calculations applied to a flat terrain with no obstacles. The typography of the terrain may cause the theoretical geographical distribution of reception levels in sector 17 to vary substantially. Again theoretically on flat terrain with no obstacle, the level Ninf is the reception level of the first three-sector antenna in the main direction 12 when the mobile in sector 17 is approaching sector 18 or in the main direction 13 when the mobile is approaching sector 19.

The levels Nsup and Ninf originate from the measurement apparatus 47 if the current frequency fc is the frequency f1 continually used by the first three-sector antenna or from the measurement apparatus 48 if the current frequency fc is the frequency f2 continually used by the second three-sector antenna. The controller 49 calculates the sum Sum and the difference Dif of the levels Nsup and Ninf.

In step 57, the controller 49 tests whether the Sum is lower than a threshold S1. The threshold S1 is predetermined to indicate that the reception power by the three-sector antenna of zone 10 is at most equal to the reception power by a three-sector antenna of a neighbouring zone 20, 30. Thus, when the sum of the reception levels of the antenna in zone 10 is lower than the threshold S1, there exists an antenna in a neighbouring zone 20, 30 with a reception power that is substantially identical, or even better than that of the antenna in zone 10. The antenna of zone 10 is considered to be suitable for communicating with the mobile in reception and in transmission when the reception power on the up channel of the mobile is higher than the threshold S1. The threshold S1 is predetermined or preferably adjustable on site so as to be matched to the typography of the terrain.

Step 58 is activated if the sum Sum is lower than the threshold S1. Step 58 triggers a handover from the communication up channel and down channel which form part of the set of channels of zone 10, to a communication up channel and down channel which form part of the set of channels of the neighbouring zone 20, 30.

A hard handover mode requires the threshold S1 be chosen in a sufficiently small manner so as to avoid undue returns back to the previous channels.

The soft handover mode is preferred for UMTS technology. The threshold S1, then chosen as a value higher than that of the hard handover mode, makes it possible to continue to use the antenna of zone 10 while beginning to use one or more antennas of one or more neighbouring zones 20, 30. The simultaneous use of several antennas of several zones of which the starting zone on the same fixed frequency fc, allows continuous operation of communication of the mobile, including when the mobile remains at a zone border or comes back into the starting zone.

Step 58 is terminated when, in a known manner, the access network decides to continue the communication by means of the antenna of one zone only, that is to say when the mobile is detected in a hard manner in a zone. The mobile is detected in a hard manner in a zone when the reception power of the antenna of this zone is appreciably higher than the threshold S1. At the end of step 58, step 50 is activated within the arrival zone which is a different zone from the starting zone or again the starting zone if the mobile has made only a brief excursion to the border of another zone.

Step 59 is activated if the sum Sum is not lower than the threshold S1. The sum Sum higher than the threshold S1 indicates that the mobile is not receding from the current zone.

In step 59, the controller 49 tests whether the difference calculated in step 50 is lower than a threshold S2. The threshold S2 is predetermined to indicate that the reception power is substantially identical in two main directions of the three-sector antenna. From the calculation in step 50 of the difference it follows that these two main directions are that one receiving the level Nsup and that one receiving the level Ninf. This occurs when the mobile is at the border of the sectors specific to each main direction.

If the difference Dif is not lower than the threshold S2, the mobile is not in the vicinity of the border which separates two sectors considered for the current frequency fc, but manifestly hard in the sector specific to the main direction for which the level Nsup is measured. Step 50 is then reactivated for a new cycle of evaluation of the radial position and of the angular position with respect to the main direction in the current sector, that is to say for a subsequent processing of the levels Nsup and Ninf in effect. Step 50 is executed by the controller of the arrival zone.

Step 60 is activated if the difference Dif tested in step 59 is lower than the threshold S2. This signifies that the mobile is in the vicinity of the border of the current sector with another sector of the same zone, that is to say on the axis of a main direction of the other three-sector antenna whose fixed frequency of transmission and of reception then constitutes a reserve frequency fr.

Step 60 triggers a hard handover, that is to say a handover from the current sector to another sector of the same zone, the communication channels still belonging to the same collection of channels which is allocated to the current zone. In step 60, the current frequency fc is toggled over to the reserve frequency fr which naturally offers better reception power along the main direction on the axis of which the mobile is found at the time of execution of step 60. The other sector is not here a sector tangent to the previous sector, considered for the same fixed frequency fc but a sector which overlaps the previous sector and a tangent sector, considered for another fixed frequency fr. The so-called reserve frequency fr then becomes the new current frequency fc. Step 50 is then reactivated for a new cycle of evaluation of the radial position and of the angular position with respect to the main direction in the new current sector specific to the main direction of transmission and of reception on the other fixed frequency, that is to say for a subsequent processing of the levels Nsup and Ninf in effect.

The access network node and the method operate for example in the following manner in respect of a mobile which is moving from the centre of sector 17 to the centre of sector 37 in FIG. 1.

Initially, the mobile being on the axis of the main direction 11, it uses an up channel from among those multiplexed on the frequency f1.

When the mobile heads towards the centre of sector 37, it begins by approaching sector 19 in zone 1. The measurement means 47 give a level Nsup along the main direction 11 and a level Ninf along the main direction 13. The controller 49 begins by detecting in step 59 that the mobile is in the vicinity of the border which separates sector 17 and sector 19 and instructs a handover from the frequency f1 to the frequency f2 so that the mobile is in sector 7 of FIG. 2 at small angular distance from the main direction 14. It is noted that the mobile is handed over from the first antenna to the second antenna of zone 10 without it having been necessary to undertake a transmission from the mobile on the frequency f2 to detect that the latter is more appropriate for obtaining a maximum reception power in zone 10. There is therefore no need to interrupt transmission on the frequency f1 before changing frequency.

The mobile, continuing to travel around in sector 7, approaches sector 2 for which the main direction 35 is naturally the most appropriate for receiving a transmission from the mobile with maximum power. The controller 49 detecting in step 57 a drop in reception power in zone 10, triggers in step 58 a soft handover from zone 10 to zones 20 and 30. The initiation of soft handover to zone 20 poses no problem since it is done at the same fixed frequency f2 as to zone 30. The soft handover terminates in zone 30 when the mobile has penetrated sufficiently into sector 2.

The mobile, continuing to travel around in sector 2, thereafter approaches the border which separates sector 2 from sector 1. Measurement means for zone 30, identical to the measurement means 48 for zone 10, give a level Nsup along the main direction 35 and a level Ninf along the main direction 34. A controller for zone 30, identical to the controller 49 for zone 10, then detects in step 59 that the mobile is at small angular distance from the main direction 31 and replaces in step 60, the frequency f2 with the frequency f1 which is the most appropriate for receiving on the first three-sector antenna of zone 30, the transmissions originating from the mobile with strong reception power.

By virtue of the presence of two three-sector antennas and the routine selection of the antenna offering greater reception power along one of its main directions, the soft handover from one zone to another is achieved naturally at optimal reception power and consequently optimal transmission power.

In the exemplary movement of the mobile just described, it is understood in FIG. 1 that the presence of a single three-sector antenna per zone would be a source of indecision between a soft handover from zone 10 to zone 20 and a softer handover from sector 17 to sector 19 when the mobile is in a vicinity simultaneously of an inter-sector border and of an inter-zone border.

The teaching of the invention can easily be extended to any number not necessarily equal to three, of sectors per antenna. For example an angular sector of 120° for a three-sector antenna, becomes a 90° sector for a four-sector antenna. The angular sectors are not necessarily of equal value when for example the typography of the terrain leads to a slightly asymmetric distribution with one sector of 130° and another of 110°. The main directions of the antennas are then altered accordingly so as to be on the axis of the inter-sector borders of the dual antenna.

The invention claimed is:

1. Access network node for covering a mobile telecommunication zone, comprising at least a first multisector antenna arranged to transmit and receive in several first main directions on one and the same first fixed frequency usable to multiplex a first multitude of channels for communications with mobiles each situated in a first sector having on either side of one of the first main directions, a common border with another first sector, wherein said access network node comprises:

a second multisector antenna situated at the same place as the first multisector antenna and arranged to transmit and receive in several second main directions on one and the same second fixed frequency usable to multiplex a second multitude of channels for communications wit mobiles each situated in a second sector having on either side of one of the second main directions, a common border with another second sector, each second main direction being on the axis of a border between two first sectors so that each border between two second sectors is on the axis of a first main direction;

means arranged to trigger a hard handover from a channel of the first multitude to a channel of the second multitude for a mobile which is approaching a border common to two first sectors and to trigger a hard handover from a channel of the second multitude to a channel of the first multitude for a mobile which is approaching a border common to two second sectors, wherein said means is also arranged to trigger a soft handover from a channel of the first multitude, respectively of the second multitude, to a channel of a third multitude, respectively of a fourth multitude of channels multiplexed on the first fixed frequency on the basis of another first multisector antenna, respectively on the second fixed frequency on the basis of another second multisector antenna belonging to another similar network node for covering an adjoining zone when a mobile which is using a channel of the first multitude, respectively of the second multitude, is approaching the adjoining zone.

2. Access network node according to claim 1, wherein the said means are arranged to periodically evaluate the strongest reception powers given by two main directions of the first, respectively of the second antenna, and to detect that the mobile is approaching a border common to two first sectors, respectively to two second sectors, when the powers evaluated are substantially equal.

3. Access network node according to claim 1, wherein the multisector antennas are three-sector antennas.

4. Method of mobile telecommunication in which a mobile uses an up channel to communicate with an access network node comprising two multisector antennas arranged to transmit and receive in several interleaved main directions, each antenna using a fixed frequency to multiplex a multitude of communication channels, the up channel being multiplexed on one of the fixed frequencies called the current frequency, the other frequency being called the reserve frequency, said method comprising:

a measurement step in which the access network node periodically evaluates the receive power on the up channel at the current frequency;

a sector test step in which the access network node analyses whether it is possible to obtain better receive power on the reserve frequency than the receive power evaluated at the current frequency;

a hard handover step in which the access network node replaces the current frequency with the reserve frequency so as to multiplex at least the up channel when it is possible to obtain better receive power on the reserve frequency than the receive power evaluated at the current frequency; and a zone test step in which the access network node gauges the total receive power of the un channel;

a soft handover step in which the access network node triggers a soft handover to another access network node while preserving the current frequency if the total receive power is too weak.

5. Method of mobile telecommunication according to claim 4, wherein:

in the measurement step, the access network node periodically evaluates two main directions giving the greatest values of receive power on the up channel;

in the sector test step, the access network node compares the receive powers in the two main directions evaluated;

in the hard handover step, the access network node replaces the current frequency with the reserve frequency so as to multiplex at least the up channel if the receive powers are substantially equal.

* * * * *

UNITED STATES PATENT AND TRADEMARK OFFICE
CERTIFICATE OF CORRECTION

| | |
|---|---|
| PATENT NO. | : 7,162,246 B2 |
| APPLICATION NO. | : 10/860684 |
| DATED | : January 9, 2007 |
| INVENTOR(S) | : Christophe Gruet and Eric Georgeaux |

It is certified that error appears in the above-identified patent and that said Letters Patent is hereby corrected as shown below:

Column 12:
Line 17, "wit" should be --with--.

Column 13:
Line 10, "un" should be --up--.

Signed and Sealed this

Tenth Day of April, 2007

JON W. DUDAS
*Director of the United States Patent and Trademark Office*